(12) United States Patent
Gazeau et al.

(10) Patent No.: US 12,479,111 B2
(45) Date of Patent: Nov. 25, 2025

(54) ROBOTIC HAND

(71) Applicants: CENTRE NATIONAL DE LA RECHERCHE SCIENTIFIQUE, Paris (FR); UNIVERSITE DE POITIERS, Poitiers (FR)

(72) Inventors: Jean-Pierre Gazeau, Chatellerault (FR); Pierre Laguillaumie, Buxerolles (FR); Philippe Vulliez, Lavoux (FR); Camille Mizera, Poitiers (FR)

(73) Assignees: CENTRE NATIONAL DE LA RECHERCHE SCIENTIFIQUE, Paris (FR); UNIVERSITE DE POITIERS, Poitiers (FR)

( * ) Notice: Subject to any disclaimer, the term of this patent is extended or adjusted under 35 U.S.C. 154(b) by 937 days.

(21) Appl. No.: 17/753,385

(22) PCT Filed: Aug. 19, 2020

(86) PCT No.: PCT/EP2020/073262
§ 371 (c)(1),
(2) Date: Mar. 1, 2022

(87) PCT Pub. No.: WO2021/043579
PCT Pub. Date: Mar. 11, 2021

(65) Prior Publication Data
US 2022/0288792 A1 Sep. 15, 2022

(30) Foreign Application Priority Data
Sep. 4, 2019 (FR) .................................. 1909724

(51) Int. Cl.
*B25J 15/00* (2006.01)
*B25J 9/10* (2006.01)
*B25J 15/10* (2006.01)

(52) U.S. Cl.
CPC .......... *B25J 15/0009* (2013.01); *B25J 9/104* (2013.01); *B25J 15/10* (2013.01)

(58) Field of Classification Search
CPC ........ B25J 15/0009; B25J 15/10; B25J 9/104; B25J 19/021
(Continued)

(56) References Cited

U.S. PATENT DOCUMENTS

| | | | | |
|---|---|---|---|---|
| 1,507,682 A | * | 9/1924 | Pecorella | A61F 2/583 623/64 |
| 5,080,682 A | * | 1/1992 | Schectman | A61F 2/583 623/64 |

(Continued)

FOREIGN PATENT DOCUMENTS

| | | |
|---|---|---|
| GB | 2551446 A | 12/2017 |
| JP | S58169988 U | 11/1983 |

(Continued)

OTHER PUBLICATIONS

International Search Report and Written Opinion received for PCT/EP2020/073262, mailed Nov. 30, 2020.
(Continued)

*Primary Examiner* — Paul T Chin
(74) *Attorney, Agent, or Firm* — Greer, Burns & Crain, Ltd

(57) ABSTRACT

A device forming a robotic hand, including a base forming the palm of a hand, at least two articulated structures each forming a robotic finger, each articulated structure being connected to the base by at least one articulation, at least one drive mechanism for each articulation, at least one actuator designed to actuate the at least one drive mechanism at least by a flexible drive connection connecting and driving the at least one drive mechanism, at least one intermediate driveshaft for relaying the movement of the at least one actuator (Continued)

such that the at least one intermediate drive shaft is actuated by an actuator, and the at least one intermediate shaft is connected to at least two distinct drive mechanisms by the at least one flexible drive connection.

11 Claims, 9 Drawing Sheets

(58) Field of Classification Search
 USPC .......................................................... 294/111
 See application file for complete search history.

(56) References Cited

U.S. PATENT DOCUMENTS

| | | | | |
|---|---|---|---|---|
| 5,447,403 | A * | 9/1995 | Engler, Jr. ........... | B25J 15/0009 |
| | | | | 294/111 |
| 8,100,451 | B2 * | 1/2012 | Okuda ................ | B25J 15/0009 |
| | | | | 294/213 |
| 8,297,672 | B2 * | 10/2012 | Kim ........................ | B25J 9/104 |
| | | | | 901/29 |
| 8,483,880 | B2 * | 7/2013 | de la Rosa Tames ...................... | |
| | | | | B25J 15/0009 |
| | | | | 600/595 |
| 8,827,337 | B2 * | 9/2014 | Murata ................ | B25J 15/0009 |
| | | | | 294/111 |
| 9,016,744 | B2 * | 4/2015 | Starkey ..................... | A61F 2/70 |
| | | | | 294/111 |
| 12,090,636 | B2 * | 9/2024 | Seki ....................... | B25J 9/1075 |
| 2005/0121929 | A1 * | 6/2005 | Greenhill ............... | B25J 9/1075 |
| | | | | 294/106 |
| 2009/0025502 | A1 | 1/2009 | Nakamoto | |
| 2009/0302626 | A1 | 12/2009 | Dollar et al. | |
| 2011/0241368 | A1 | 10/2011 | Kurita et al. | |
| 2016/0073584 | A1 | 3/2016 | Davidson et al. | |
| 2017/0217014 | A1 | 8/2017 | Riviere et al. | |

FOREIGN PATENT DOCUMENTS

| | | |
|---|---|---|
| JP | 2006247805 A | 9/2006 |
| JP | 2010247320 A | 11/2010 |
| WO | 2016/005871 A1 | 1/2016 |

OTHER PUBLICATIONS

French Search Report received for Application No. 1909724, dated May 19, 2020.

Lee, Y., et al., "A biomimetic hand employing a dual actuation scheme," Journal of Mechanical Science and Technology 26, No. 12, 2012, pp. 4131-4139.

Notice of Reasons for Refusal for Japanese Application No. 2022-514695, dated May 7, 2024.

* cited by examiner

ROBOTIC HAND

BACKGROUND

The present invention relates to the field of robotic hands.

Producing robotic digits or hands is a crucial challenge in many fields.

A robotic hand is known from the document FR 3,027,246, comprising four robotic digits, one of which is a thumb, each digit having several articulations, each being actuated by means of a system of cables and pulleys and by an electric actuator. The thus-developed robotic hand has four actuators per digit. In light of the state of the prior art, this arrangement makes it possible to reduce the number of actuators necessary to move the digits and thus reduce the weight and bulk of the robotic hands.

Although this is satisfactory, it is desirable to produce a robotic hand arrangement further reducing the weight and bulk.

A purpose of the invention is both to reduce the weight and bulk of a robotic hand and to contain the bulk of said hand such as to resemble a human hand as closely as possible. Another purpose of the invention is to simplify the actuation of the robotic hands.

SUMMARY

According to a first aspect of the invention, at least one of the aforementioned purposes is achieved with a device forming a robotic hand comprising:
- a base forming a palm of the hand,
- at least two articulated structures each forming a robotic digit, each articulated structure being functionally connected to the base and comprising at least one articulation, so as to move said articulated structure with respect to the base,
- at least one drive mechanism for moving each articulation,
- at least one actuator arranged to actuate the at least one drive mechanism by means of at least one flexible drive link connecting and driving the at least one drive mechanism,
- at least one intermediate drive shaft for transmitting the movement of the at least one actuator, functionally disposed between the at least one actuator and the at least one actuated drive mechanism, in such a way that:
- the at least one intermediate drive shaft is actuated by an actuator, and
- the at least one intermediate drive shaft is functionally connected to at least two distinct drive mechanisms, each drive mechanism being functionally connected to said intermediate drive shaft by means of the at least one flexible drive link.

The device according to the invention has the advantage of significantly reducing the bulk and the weight of a robotic hand and at the same time improving its appearance so as to resemble a human hand. Moreover, the cost of production is significantly reduced on account of the reduction in the number of actuators. The robotic hand thus proposed is more efficient than the robotic hands of the prior art.

In respect of the above and/or for the rest of the description, the following terms are defined:

articulated structure, a structural element connected to the base by an articulation, or an assembly of structural elements connected one after another by an articulation and a structural element among the set of structural elements connected to the base by an articulation, each element being arranged and configured to form a phalanx of a robotic digit, an articulated structure forming a robotic digit; hereinafter, the terms articulated structure or digit may be used interchangeably, structural element, a part connecting two articulations by their two opposite ends, or a part connecting one articulation by one of its two opposite ends, the structural element being capable of having a slender shape so as to produce a phalanx of a robotic digit, articulation, a mechanical link producing at least one relative rotational movement between two structural elements or between the base and a structural element, two articulations having different types and/or different functions, two distinct mechanical links, a first mechanical link and a second mechanical link, each performing at least one relative rotational movement between two structural elements or between the base and a structural element, different types of articulation, articulations differentiated by a different axis of rotation, for example axes of rotation that are not parallel to one another, or axes of rotation that are orthogonal to one another, different articulation functions, articulations defined by positions spaced apart from one another, for example separated by a structural element, such that, within the context of two articulations, the first articulation carries out a first function, called first flexion function, and the second articulation carries out a second function, called second flexion function.

According to the optional improvements of the invention:

at least one intermediate drive shaft is functionally connected to at least two drive mechanisms, each mechanism being functionally disposed on a distinct articulated structure; this characteristic making it possible to synchronize two articulations of two distinct articulated structures, the at least two articulated structures each comprise at least two structural elements and at least two articulations having different types and/or different functions, which are functionally connected together at at least two articulations to form a robotic digit, the at least one intermediate drive shaft being functionally connected to at least two drive mechanisms associated with an articulation of the same type and/or function, each mechanism being disposed on a distinct articulated structure; this characteristic making it possible to synchronize two articulations of the same type of at least two distinct articulated structures, the at least two articulated structures are substantially identical and each comprise at least two structural elements and at least two articulations having different types and/or different functions, which are functionally connected together at at least two articulations to form a robotic digit, the assembly of the at least two articulated structures defining at least two rows of articulations of the same type and/or the same function, the at least one intermediate drive shaft being functionally connected to at least two drive mechanisms associated with an articulation of the same row, each mechanism being disposed on a distinct articulated structure; this characteristic making it possible to synchronize two articulations of the same row of at least two distinct articulated structures, the at least two articulated structures each comprise at least two structural elements and at least two articulations having different types and/or different functions, which are functionally connected together at at least two articulations to form a robotic digit, and the at least two articulations are coupled to one another by means of a flexible connecting link, preferably the at least two articulations being consecutive; this characteristic makes it possible to simplify the drive of the articulations, the at least one actuator is associated with a single intermediate drive shaft, the at least one actuator comprises an axis of rotation that is parallel and not coaxial with the axis of the at least one intermediate drive shaft, in such a way that each intermediate drive shaft is actuated by an actuator by means of a flexible actuation link, the device comprises at least two actuators, a first actuator and a second actuator, arranged in parallel and side by side, the second actuator of which has a rotation shaft emerging from a side opposite to that of the first actuator; this characteristic making it possible to limit even further the bulk of the device forming the robotic hand, the device forming a robotic hand comprises four articulated structures forming four robotic digits, in particular four robotic digits disposed with respect to the base so that three robotic digits can be substantially aligned with one another and parallel to the geometric plane passing through the base, preferably one of the four robotic digits forming a thumb, the device forming a robotic hand comprises exactly two actuators to actuate respectively two intermediate drive shafts, so as to drive respectively two rows of articulations, preferably two rows of articulations of at least three articulated structures, one of which is a thumb; this characteristic makes it possible to synchronize the movement of all the articulated structures, for example in order to grip cylindrical pieces, the device forming the robotic hand comprises exactly six actuators to actuate respectively six intermediate drive shafts so as to drive respectively three rows of articulations of at least three articulated structures forming at least three robotic digits apart from the thumb and three articulations of an articulated structure forming a robotic thumb, the at least one articulation is of the type producing a pivot link about an axis of flexion with respect to the base, the axis of the at least one intermediate shaft being substantially parallel to the axis of flexion of the at least one articulation, the at least one intermediate drive shaft comprises at least one drive pulley and the at least one drive mechanism comprises at least one driven pulley, in such a way that the at least one flexible drive link is connected to said pulleys, the device comprises an actuation support on which the at least one actuator and the at least one intermediate drive shaft are fixed, the support being connected functionally to the base, the at least one actuator and the at least one intermediate drive shaft are inserted and/or fixed in the base.

According to a second aspect of the invention, provision is made for a robot comprising at least one articulated arm, which comprises at least one device forming a robotic hand according to one or more of the characteristics of the first aspect of the invention.

BRIEF DESCRIPTION OF THE DRAWINGS

Other characteristics and advantages of the invention will become apparent on reading the detailed description of implementations and embodiments that are in no way limitative, in light of the attached figures in which.

DETAILED DESCRIPTION

The embodiments that will be described hereinafter are in no way limitative; variants of the invention can in particular be implemented comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

Figure 3:
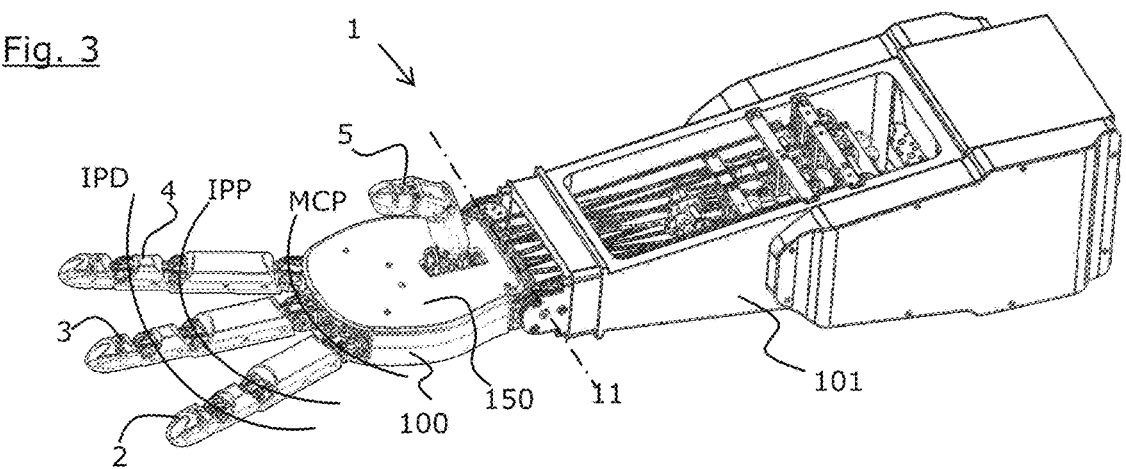
FIG. 3 is a perspective view of a device forming a robotic hand according to an embodiment of the invention comprising four articulated structures, each forming a robotic digit, connected to a base according to FIGS. 1 and 2, and a support intended to comprise actuators and intermediate drive shafts, the support being connected to the base so as to form a forearm.
Figure 4:
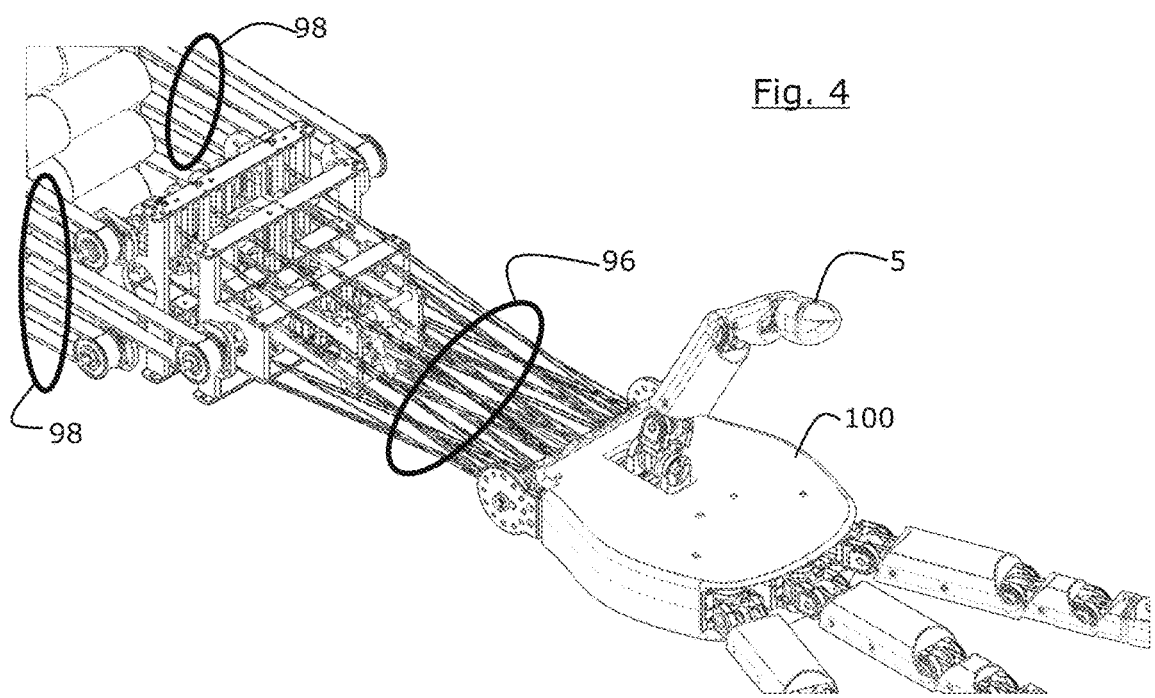
FIG. 4 is a perspective view of a device forming a robotic hand according to FIG. 3, the support being partially shown and viewed as transparent so as to distinguish a part of the actuators, the intermediate drive shafts, the flexible actuation links between said actuators and said shafts and flexible drive links between said shafts and the base according to an embodiment.

FIG. 3 illustrates a device 1 forming a robotic hand comprising a base 100 forming a palm, and four articulated structures 2, 3, 4 and 5 forming digits, each articulated structure being connected to the base so as to produce a robotic hand, substantially resembling a human hand. The base 100 has a substantially rectangular shape, which at a distal end has three digits 2, 3, 4 disposed beside one another, said digits, at rest as shown in FIG. 3, extending in the geometric plane defined by the base. In comparison with the human hand, the articulated structures or digits 2, 3 and 4 correspond respectively to the index, middle and ring fingers. The base 100 also has, on a face 150 of the palm, an articulated structure 5 forming a thumb which extends substantially perpendicular to the palm face of the base. The device 1 also comprises an actuation support 101 receiving and holding actuation and transmission of movement means that will be described below. The actuation support 101 is connected to a proximal end of the base 100 by an articulation. According to the embodiment shown, the articulation between the base 100 and the actuation support 101 is a mechanical pivot link with flexion 11. The actuation support 101 thus produces a forearm. According to other embodiments (not shown), the actuation and transmission of movement means can be inserted in the base.

Figure 1:
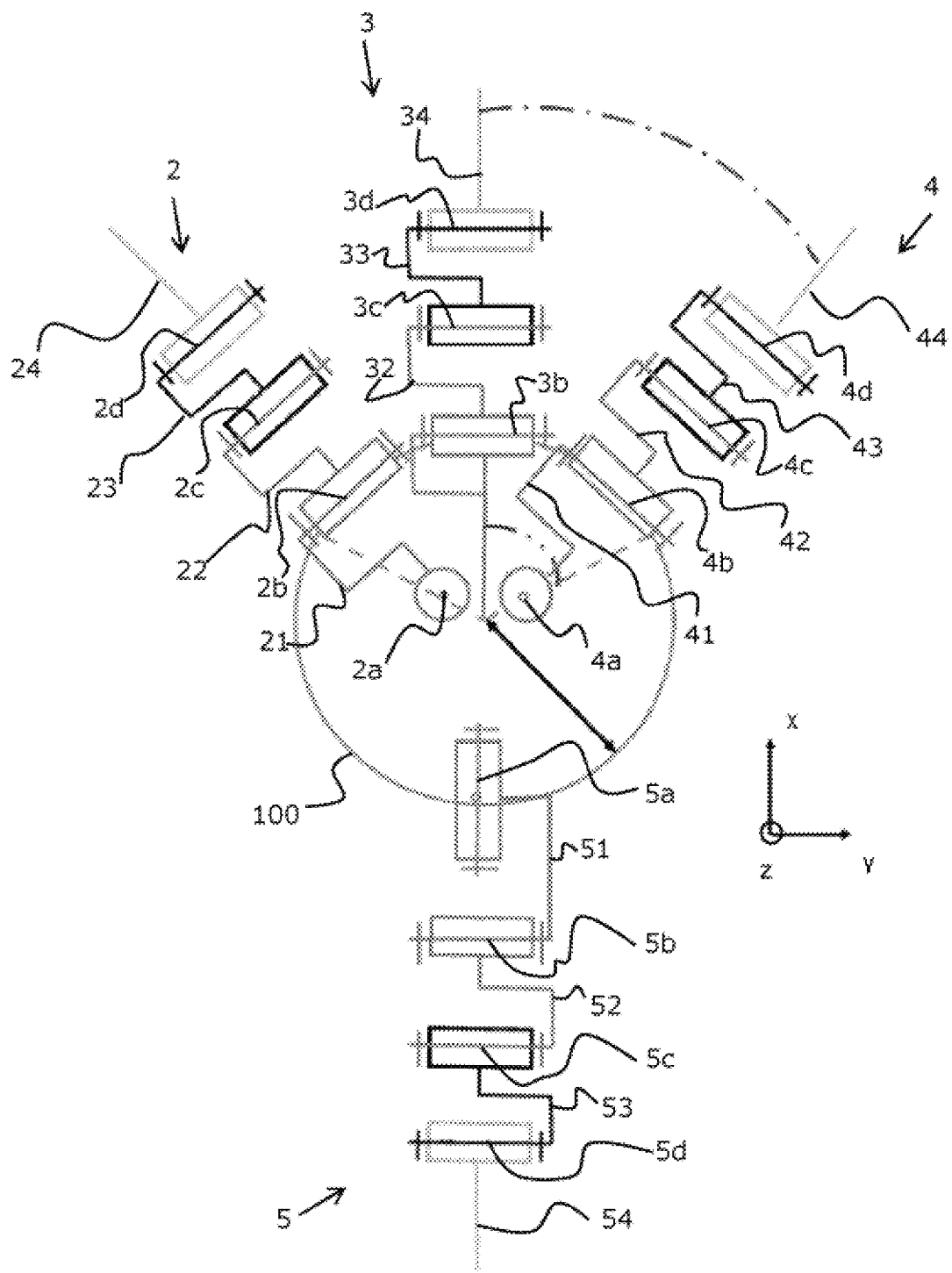
FIG. 1 is a kinematic diagram of four articulated structures, each forming a robotic digit, connected to a base of a device forming a robotic hand according to an embodiment of the invention.
Figure 2:
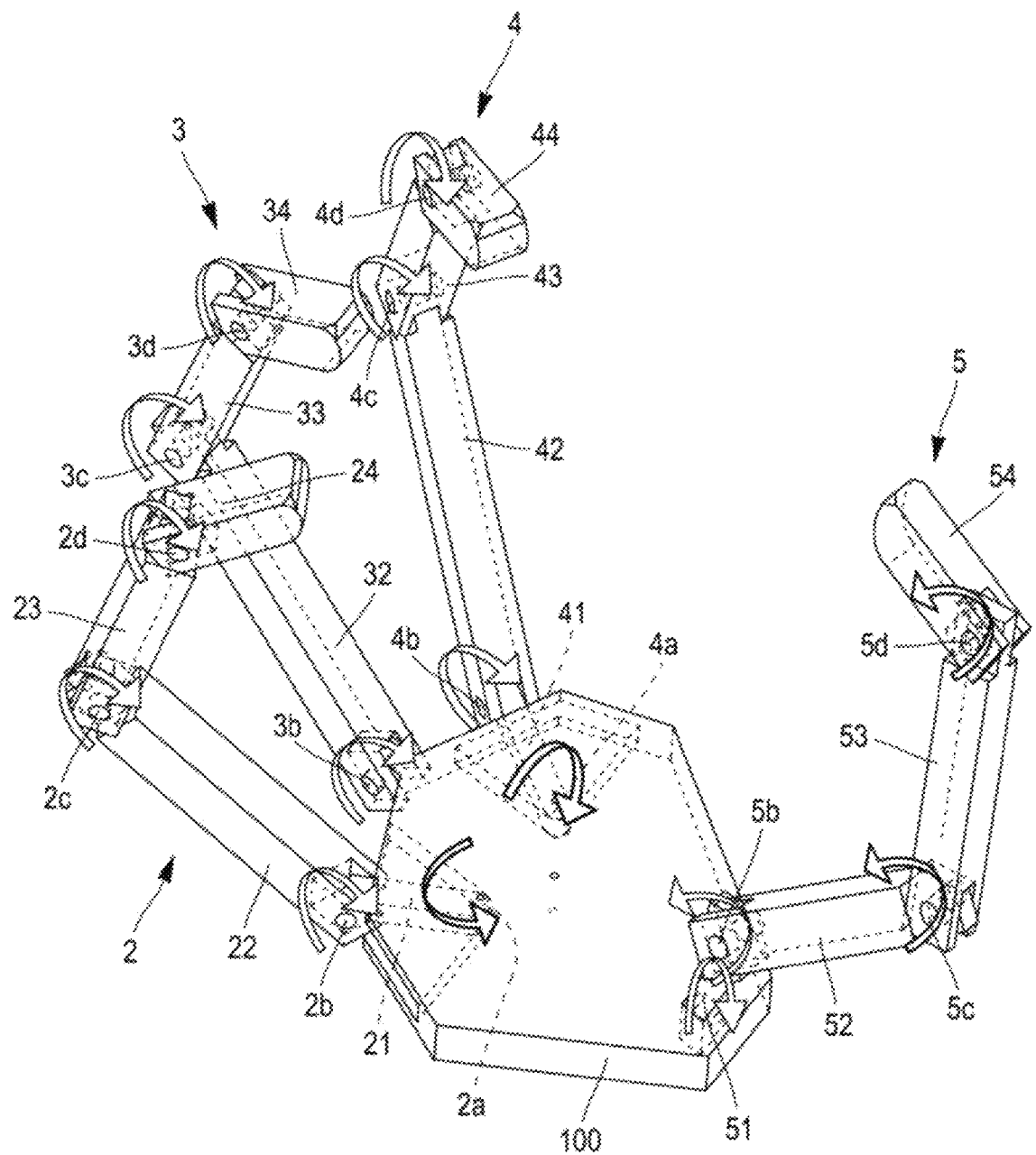
FIG. 2 is a perspective view of a base and of four articulated structures, each forming a robotic digit, connected to a base of a device forming a robotic hand according to FIG. 1.

FIGS. 1 and 2 illustrate the degrees of mobility of the articulated structures 2, 3, 4 and 5 with respect to the base 100. Each articulated structure, or digit, comprises structural elements connected to one another by articulations so as to move said articulated structure with respect to the base. In particular, each articulated structure comprises at least one articulation defining a mechanical link between the base and said articulated structure. Each articulated structure comprises an alternate succession of structural elements and articulations.

Provision is made for two types of structural elements. The device provides on the one hand, for linking structural elements 21, 41 and 51 so as to connect two different types of articulation, and on the other hand for elements of ergonomic structure so as to form phalanges. With reference to the figures, each digit 2, 3, 4 and 5 respectively comprises a first phalanx 22, 32, 42, 52, a second phalanx 23, 33, 43, 53, and a third phalanx 24, 34, 44, 54.

The device provides for two types of articulations: articulations of the abduction/adduction type so as to perform at least one pivoting along the z axis (see FIG. 1), and articulations of the flexion/extension type so as to perform at least one pivoting along the y axis (see FIG. 1). According to the embodiment shown, provision is made for fifteen articulations for moving the articulated structures with respect to the base. Three articulated structures have four articulations: the thumb 5, the index finger 2 and the ring finger 4. The middle finger 3 has three articulations.

According to the embodiments shown, the thumb 5, the index finger 2 and the ring finger 4 each have an abduction/adduction articulation 2a, 4a, 5a connecting the base 100 to a first proximal end of a linking structural element 21, 41, 51. The abduction/adduction articulations of the index finger 2a and of the ring finger 4a are positioned close to the distal end of the base 100 (see FIG. 2). The two abduction/adduction articulations define a row of abduction/adduction articulations. The abduction/adduction articulation 5a is positioned on the palm face 150 (see FIG. 3). The middle finger 3 does not have an abduction/abduction articulation.

Each digit 2, 4, 5 comprises a first flexion/extension articulation 2b, 4b, 5b connecting the distal end of the linking structural element 21, 41, 51 to a proximal end of a first phalanx 22, 42, 52. The middle finger 3 also comprises a first flexion/extension articulation 3b connecting the distal end of the base 100 to a proximal end of a first phalanx 32. The first flexion/extension articulations define a row of metacarpophalangeal (MCP) articulations. In particular, the row of metacarpophalangeal (MCP) articulations comprises the first flexion/extension articulations 2b of the index finger, 3b of the middle finger, and 4b of the ring finger, see FIG. 3.

Then, each digit 2, 3, 4 and 5 comprises a second flexion/extension articulation 2c, 3c, 4c, 5c connecting the distal end of the first phalanx 22, 32, 42, 52 to a proximal end of a second phalanx 23, 33, 43, 53. The second flexion/extension articulations define a row of proximal interphalangeal (PIP) articulations. In particular, the row of proximal interphalangeal articulations comprises the second flexion/extension articulations 2c of the index finger, 3c of the middle finger, and 4c of the ring finger, see FIG. 3.

Finally, each digit 2, 3, 4 and 5 comprises a third flexion/extension articulation 2d, 3d, 4d, 5d connecting the distal end of the second phalanx 23, 33, 43, 53 to a proximal end of a third phalanx 24, 34, 44, 54. The third flexion/extension articulations define a row of distal interphalangeal (DIP) articulations. In particular, the row of distal interphalangeal articulations (DIP) comprises the third flexion/extension articulations 2d of the index finger, 3d of the middle finger, and 4d of the ring finger, see FIG. 3.

With reference to FIG. 1, all the articulations are pivot links. With reference to the index finger 2 and the ring finger 4, each abduction/adduction articulation 2a, 4a is produced by a pivot link of axis z. With reference to the thumb 5, the abduction/adduction articulation 5a is produced by a pivot link of axis x. With reference to the digits 3 and 5, each flexion/extension articulation is produced by a pivot link of axis y. With reference to the digits 2 and 4, each flexion/extension articulation is produced by a pivot link of axis y, when said digits, the index finger 2 and the ring finger 4, are parallel to the middle finger 3, as shown for example in FIG. 11.

Figure 12:
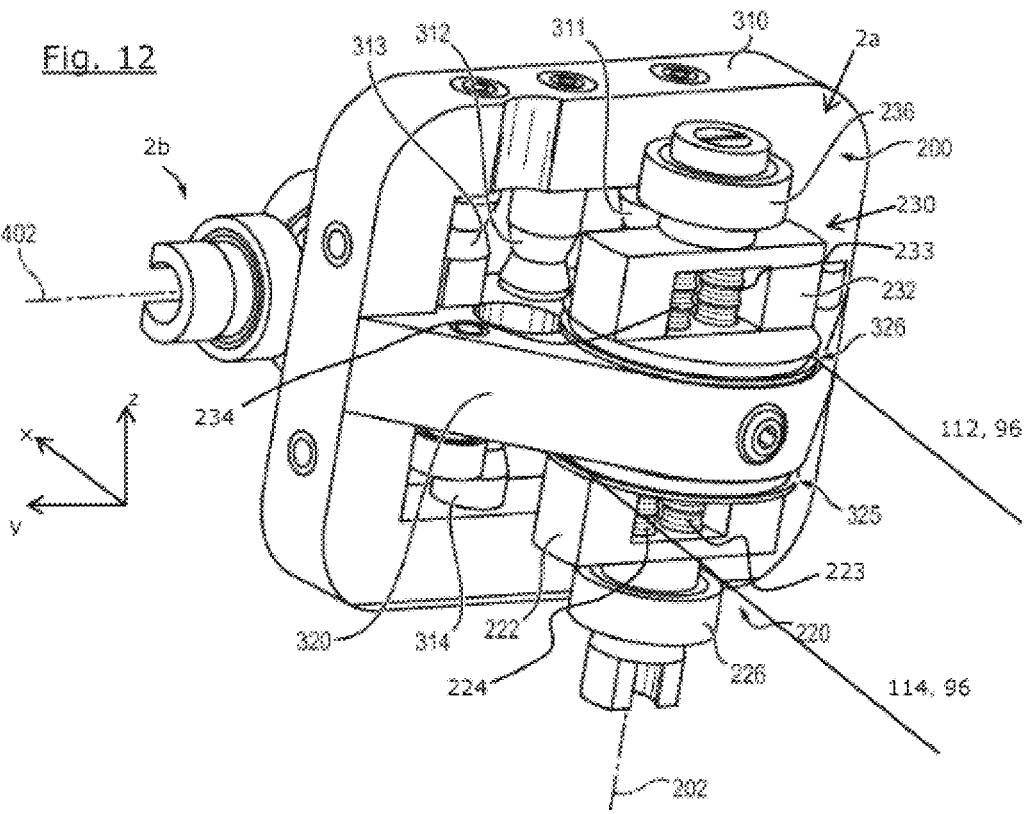
FIG. 12 is a perspective view of two articulations and of a structural element connecting the two articulations, the two articulations having axes of rotation that are not parallel to one another, corresponding to abduction/adduction and flexion/extension axes.
Figure 13:
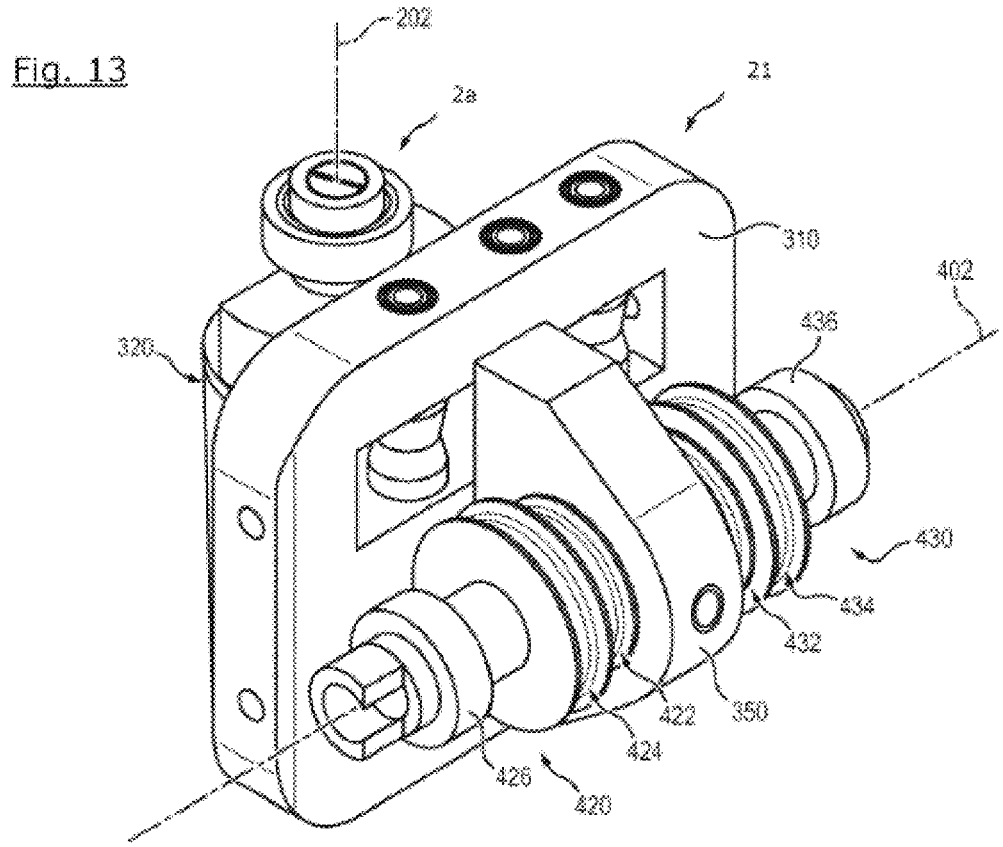
FIG. 13 is a perspective view, according to a viewing angle opposite to FIG. 12, of two articulations of a structural element connecting the two articulations, the two articulations having axes of rotation that are not parallel to one another, corresponding to abduction/adduction and flexion/extension axes.
Figure 14:
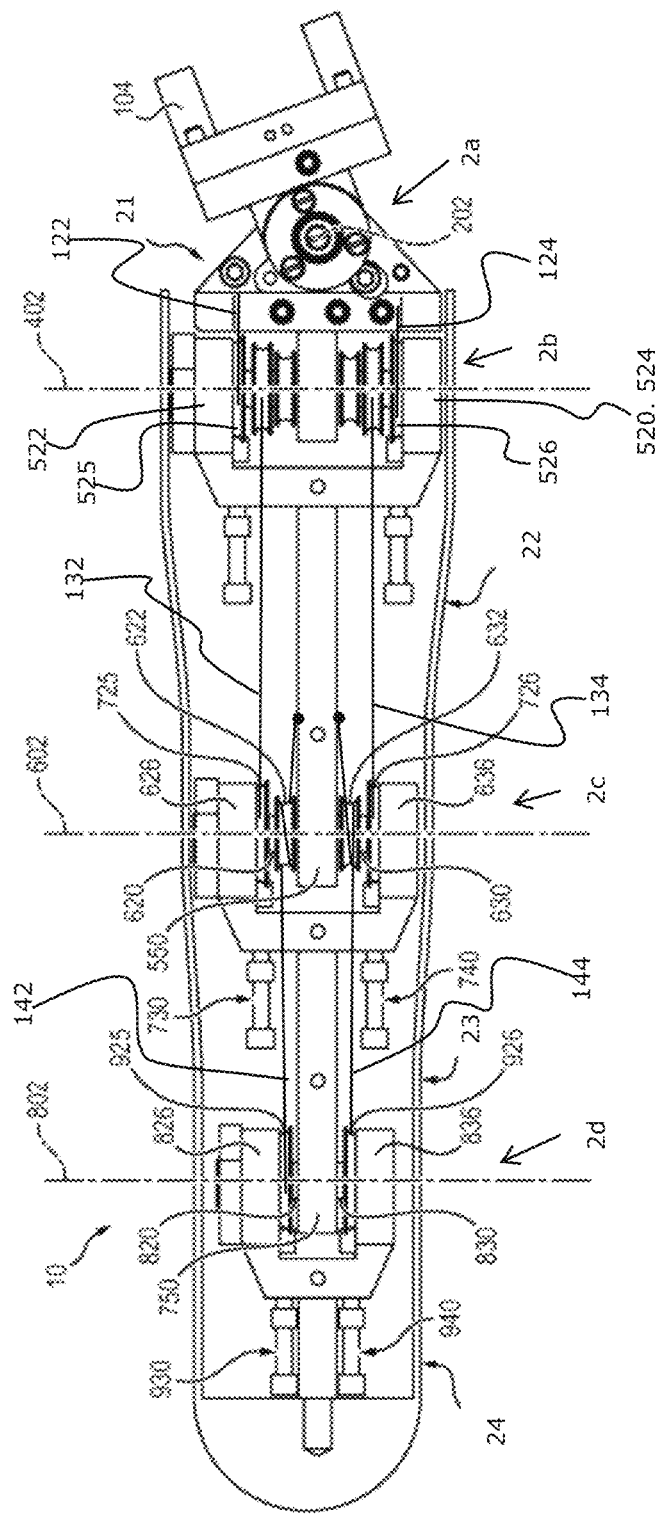
FIG. 14 is a top view of an articulated structure forming a robotic digit comprising four articulations, one abduction/adduction articulation and three flexion/extension articulations.

The device comprises driven drive pulleys positioned close to the articulations so as to move the structural elements in pivot motion with respect to one another, see FIGS. 12, 13 and 14.

FIGS. 12 and 13 show a linking structural element 21 bearing an abduction/adduction articulation 2a and a flexion/extension articulation 2b, of the type provided for the index finger. The linking structural element is the same for the ring finger and the thumb. The linking structural element 21 has the form of a support framework 310 the median plane of which extends, at rest; i.e. in centred position with respect to the extreme positions of abduction and adduction, in the plane yz. The support framework 310 bears respectively on its two opposite faces on either side of the yz median plane, the abduction/adduction articulation 2a the axis of rotation of which extends along the z axis, and the flexion/extension articulation 2b the axis of rotation of which extends along the y axis.

The linking structural element also comprises a bridge 320 on a first face of the support framework 310. The bridge 320 has the shape of a dihedron, the thickness median plane of which extends in a plane xy and which supports rotationally two abduction/adduction half-shafts 220, 230 arranged coaxially, the pivot axis 202 of which extends parallel to the z axis. The half-shafts 220, 230 are held immobile with respect to the bridge 320. The half-shafts 220, 230 are articulated with respect to the base 100, via bushes or bearings 226, 236, so that the linking structural element 21 pivots about the axis 202 relative to the base. The linking structural element 21 comprises driven drive pulleys 325 and 326 arranged to each receive a flexible drive link 96, so that the linking structural element 21 is moved in pivot motion about the axis 202 by adhesion of the flexible link on the pulley.

Preferably, the flexible links are secured on the driven pulleys 325, 326 by respective anchoring points that are diametrically opposite with respect to the axis 202.

In a variant, the flexible drive links can be wound at least partially about the pulleys 325, 326, or even perform a complete turn about these pulleys, in respectively opposite directions, and their second ends are fixed on the bridge 320.

In both cases, a person skilled in the art will understand that the rotational displacement of an actuator in one direction applies a tractive force on the first adduction cable 114 and by action on the pulley 325 and/or the bridge 320 leads to a displacement of the digit in an abduction/adduction direction (see the arc of circle in FIG. 1). Conversely, the rotational displacement of the same actuator in the reverse direction applies a tractive force on the second adduction cable 112 and by action on the pulley 326 and/or the bridge 320 leads to a displacement of the digit in an abduction/adduction direction.

Between the pulleys 325, 326 and the bearings 226, 236, each half-shaft or journal 220, 230 bears a cage 222, 232 each defining a window for the passage and guidance of flexible drive links or cables 96, in particular pairs of cables 122, 124; 132, 134, directed towards the downstream articulations 2b and 2c. Each cage 222, 232 has two series of cylindrical rotating parts, respectively coaxial, in the shape of a diabolo 223, 224 and 233, 234. Each series of parts in the shape of a diabolo 223, 224 and 233, 234 is centred on a respective z axis. The diabolo-shaped parts 223, 224 provided in the cage 222 are symmetrical with respect to the axis 202. Similarly, the diabolo-shaped parts 233, 234 provided in the cage 232 are symmetrical with respect to the axis 202.

Each series of parts in the shape of a diabolo 223, 224 and 233, 234 further includes a number of parts in the shape of a diabolo equal to the number of cables to be guided, respectively 122, 132 and 124, 134.

According to the embodiment shown in FIG. 12, each half-shaft or journal 220, 230 guides two flexible drive links or cables 122, 132 and 124, 134. As a result, each series of parts 223, 224 and 233, 234 in the shape of a diabolo includes at least two parts in the shape of a diabolo stacked axially on the z axis. On the axis 202 of the abduction/adduction movement, provision is therefore made for a set of at least four diabolos positioned on the upper part of the axis for guiding at least two cables and a set of four diabolos (partially visible) on the lower portion of the axis for guiding two cables.

Each pair of two adjacent diabolos belonging to the two series of parts 223, 224 and 233, 234 situated in a common cage 222, 232 thus define respective passages intended to receive the flexible drive links intended to move the driven pulleys. Each cable is thus guided between two rotating diabolos.

Each diabolo is capable of rotation about its axis, on a central articulation rod connected to the cage 222 or 232, in order to limit the friction between the cables and the diabolos.

After their passage through the abduction/adduction articulation 2a, each of the flexible drive links or cables is thus guided via a diabolo 311, 312, 313 and 314, 315, 316 towards the axis of the flexion/extension articulation 2b, see FIG. 14.

With reference to FIG. 13, the linking structural element 21 comprises a bridge 350 on a second face of the support framework 310. The bridge 350 has the shape of a dihedron, the thickness median plane of which extends in a plane xz and which supports rotationally two coaxial flexion/extension half-shafts 420 and 430 extending along an axis of flexion/extension 402 of the flexion/extension articulation 2b, which is parallel to the axis y, and which is orthogonal to the abduction/adduction axis 202. The two flexion/extension half-shafts 420, 430 are connected in a fixed manner rotationally with respect to the bridge 350. The two half-shafts or journals 420, 430 are situated respectively on either side of the bridge 350.

The half-shafts each bear a bush 426, 436 arranged to produce a pivot articulation of the second structural element (not shown), or of the first phalanx 22, with respect to the linking structural element 21, so that the first phalanx pivots relatively to said linking structural element 21. The bushes 426, 436 form rotational guide bearings for a yoke 520 (shown in FIG. 14) of the first phalanx 22.

The half-shaft 420 bears two idler pulleys 422, 424 on which the flexible drive links or cables are respectively provided to be wound while travelling one rotation of these pulleys. The other half-shaft 430 bears another two idler pulleys 432, 434 on which provision is made for the flexible links or cables to be wound while travelling one rotation of these pulleys. The idler pulleys 422, 424 and 432, 434 are in free rotation with respect to the bridge 350 about the axis 402.

The round turn of the cables performed about the guiding idler pulleys 422, 424 and 432, 434, in free rotation about their axis, makes it possible to prevent cables coming out of the pulleys as a function of the articular configuration of the flexion/extension movement of the phalanges.

The idler pulleys make it possible to respectively return four cables originating from the cages 222 and/or 232 towards downstream flexion/extension articulations of the intermediate phalanx 23.

FIG. 14 shows an embodiment of an articulated structure or digit. As indicated above, all the digits of the robotic hand are functionally similar with the exception of the middle finger 3 which does not comprise an abduction/adduction articulation. To avoid repetition, a single articulated structure is described hereinafter, using the references of the index finger 2. The articulated structure 2 comprises four structural elements: a linking structural element 21 and three phalanges 22, 23 and 24. Preferably, the articulated structure is actuated by three actuators only (described below). Each structural element is moved via two flexible drive links or cables 112, 114; 122, 124; 132, 134 and 142, 144.

The two branches 522, 524 of the yoke 520 of the first phalanx 22 bear pulleys 525, 526 centred on the axis 402, said pulleys guiding the respective second end of the cables 122, 124 that make it possible to move the first abduction/adduction articulation 2b.

The pulleys 525, 526 must be connected rotationally with the yoke 520 if the ends of the cables 122, 124 are fixed on these pulleys.

The pulleys 525 and 526 can be in free rotation with respect to the yoke 520 about the axis 402, if the ends of the cables 122, 124 are fixed not on the aforementioned pulleys but on the yoke 520.

The two branches 626, 636 of the second phalanx 23 bear pulleys 725, 726 centred on the axis 602, said pulleys guiding the respective second end of the cables 132, 134 which make it possible to move the second abduction/adduction articulation 2c.

Figure 7:
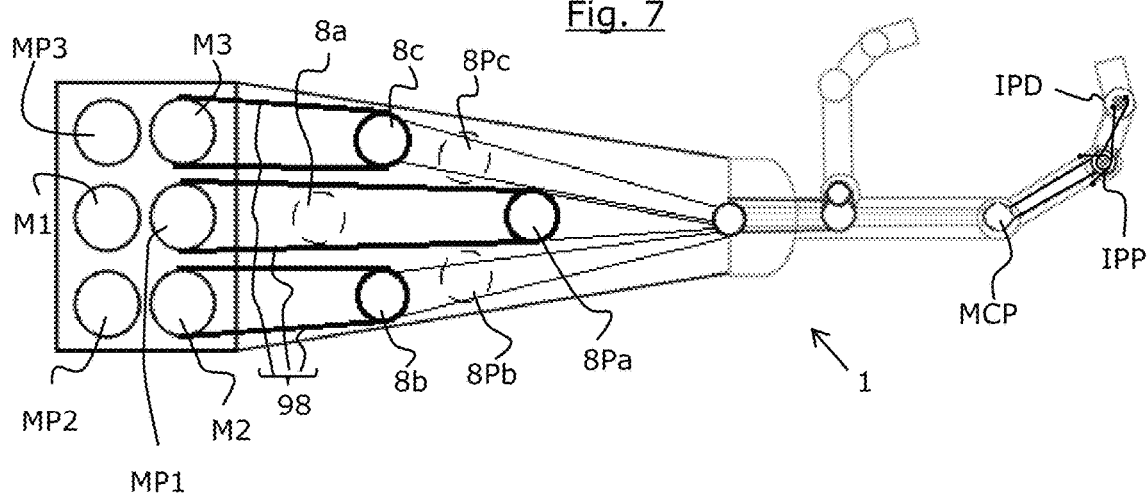
FIG. 7 is a left view of a device forming a robotic hand shown diagrammatically and according to FIG. 6, diagrammatically representing the path of flexible drive links between the intermediate drive shafts and the drive pulleys mounted on articulations of articulated structures, in particular intended to control the abduction/adduction of the thumb, and the flexion/extension of the other digits.

The two branches 826, 836 of the third phalanx 24 bear pulleys 925, 926 centred on the axis 802, said pulleys guiding the respective second end of the cables 142, 144 which make it possible to move the third abduction/adduction articulation 2c. According to an embodiment, the first ends of the cables 142, 144 are fixed to the first phalanx 22 upstream of the articulation 2c. Then the cables 142, 144 are respectively wound about the pulleys 622, 632 centred on the axis 602. The pulleys 622, 632 are in free rotation about the axis 602. The direction of winding of the cable 144 about the pulley 632 is performed in a reverse direction to the direction of winding of the cable 142 about the pulley 622. Moreover, the cables 142 and 144 cross one another before reaching the pulleys 925, 926; the crossing of the cables 142 and 144 is shown in FIG. 7 but is not shown in FIG. 14. During the driving of the articulation 2c (or the pivoting of the phalanx 23 with respect to the phalanx 22) and due to the fact that the traction exerted by one or other of the cables 142 or 144, the pulleys 925, 926 are driven pivotably so as to drive the articulation 2d in motion. This embodiment makes it possible to dispense with the use of an actuator, by using a single actuator for two articulations.

The means of actuation and drive making it possible to move the articulated structures of the robotic hand will now be described.

Figure 6:
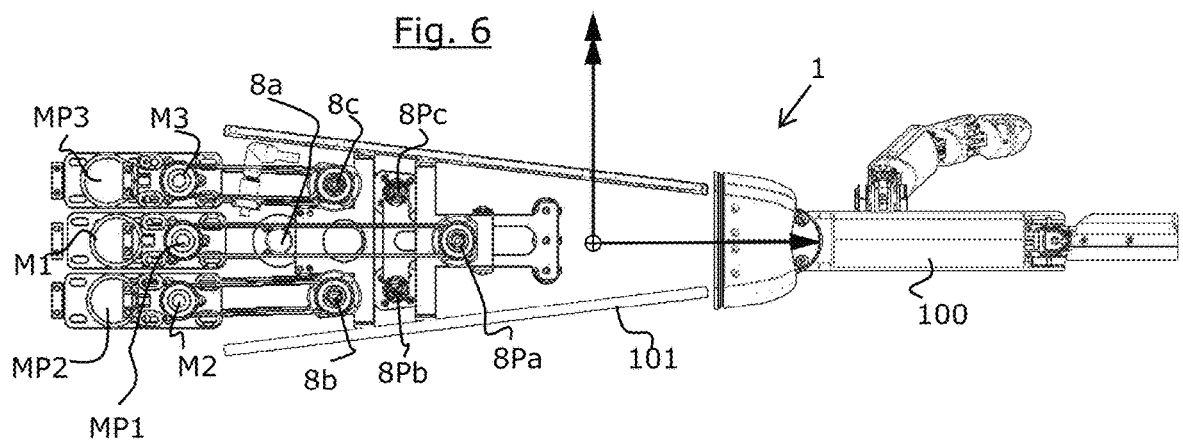
FIG. 6 is a left horizontal view of a device forming a robotic hand according to FIGS. 3 to 5, the support being viewed as transparent, the latter comprising six actuators and six intermediate drive shafts, which are superimposed in three stages: a first stage, a second stage and a third stage, respectively comprising two actuators and two intermediate drive shafts.
Figure 8:
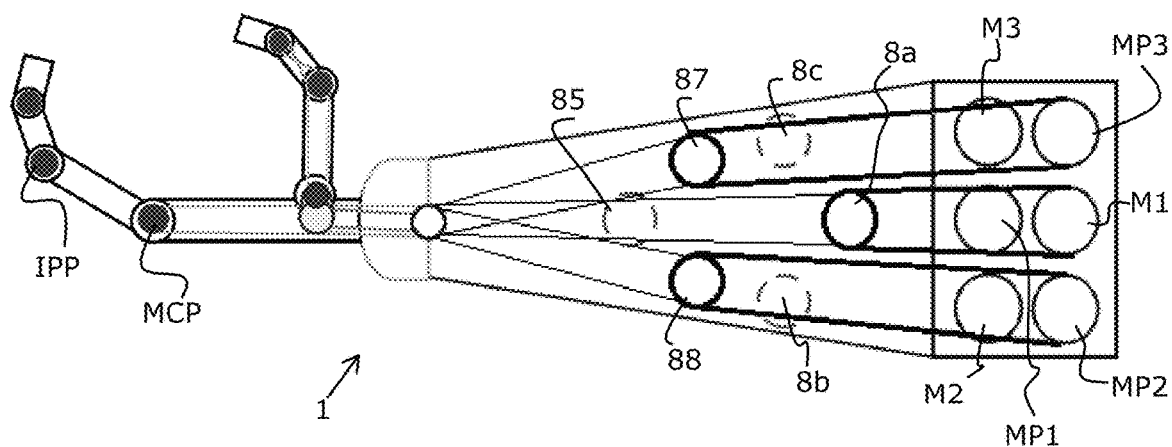
FIG. 8 is a right view of a device forming a robotic hand shown diagrammatically and according to FIG. 6, diagrammatically representing the path of flexible drive links between intermediate drive shafts and drive pulleys mounted on articulations of articulated structures, in particular intended to control the flexion/extension of the thumb and the abduction/adduction of the other digits.

With reference to FIGS. 6, 7 and 8, the device forming a robotic hand comprises six actuators M1, M2, M3, MP1, MP2 and MP3 for the actuation of all the articulations. The six actuators preferably comprise motor-reduction units. The actuator M1 is arranged to actuate the articulations of the row of abduction/adduction articulations. The actuator M2 is arranged to actuate the articulations of the row of metacarpophalangeal articulations. The actuator M3 is arranged to actuate the articulations of the row of proximal interphalangeal articulations. The actuator MP1 is arranged to actuate the abduction/adduction articulation of the thumb 5. The actuator MP2 is arranged to actuate the first flexion/extension articulation of the thumb 5. The actuator MP3 is arranged to actuate the second flexion/extension articulation of the thumb 5. The six actuators extend horizontally and are superimposed one above the other in two columns of three superimposed actuators. This characteristic makes it possible to improve the compactness of the device forming a robotic hand.

Figure 5:
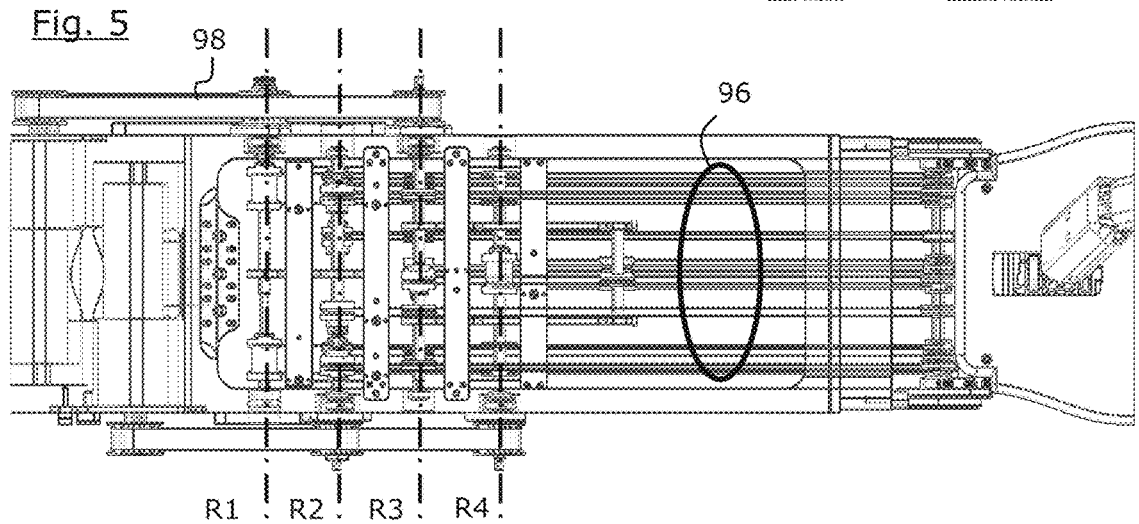
FIG. 5 is a top view of a support comprising two actuators disposed head to tail and four intermediate drive shafts disposed in parallel with respect to one another.

The device 1 forming a robotic hand also comprises six intermediate drive shafts 8a, 8b, 8c, 8Pa, 8Pb, 8Pc. The intermediate drive shafts participate with the flexible drive links to transmit the rotational movements of the actuators to the driven pulleys of the articulations, so as to move the robotic hand. In particular, each intermediate drive shaft 8a, 8b, 8c, 8Pa, 8Pb, 8Pc is actuated by a single actuator. With reference to FIGS. 6, 7 and 8, the actuator M1 is associated with the intermediate drive shaft 8a, actuator M2 is associated with the intermediate drive shaft 8b, actuator M3 is associated with the intermediate drive shaft 8c, actuator MP1 is associated with the intermediate drive shaft 8Pa, actuator MP2 is associated with the intermediate drive shaft 8Pb, actuator MP3 is associated with the intermediate drive shaft 8Pc. Each actuator is connected to its intermediate drive shaft by means of a flexible drive link 98, for example a belt. For example, each actuator and each intermediate drive shaft respectively bears a pulley or a toothed wheel in order to cooperate with a flexible actuation link, and thus transmit the rotational movement of the actuator to the intermediate actuation shaft. The intermediate actuation shafts extend substantially parallel to one another and parallel to the actuators. They are disposed side by side so that when viewed from the side their positioning forms a triangle or a diamond and allows smaller bulk heightwise. This characteristic makes it possible to confer on the actuation support an overall bulk resembling that of a human forearm. Viewed from above, the six intermediate drive shafts are disposed so as to form four columns or four rows: R1, R2, R3 and R4, see FIG. 5. The row R1 comprises the intermediate drive shaft 8a. The row R2 comprises the superimposed intermediate drive shafts 8b and 8c. The row R3 comprises the superimposed intermediate drive shafts 8Pb and 8Pc. The row R4 comprises the intermediate drive shaft 8Pa.

With reference to FIGS. 4, 5, 6, 7, 8, the actuators and the intermediate drive shafts are disposed head to tail. Along each lateral side of the actuation support 101, three actuators are connected with three respective intermediate shafts by means of a flexible actuation link 98, see FIGS. 7 and 8.

The intermediate drive shafts are connected to the articulations of the articulated structures via flexible drive links or cables 96 already described.

Figure 9:
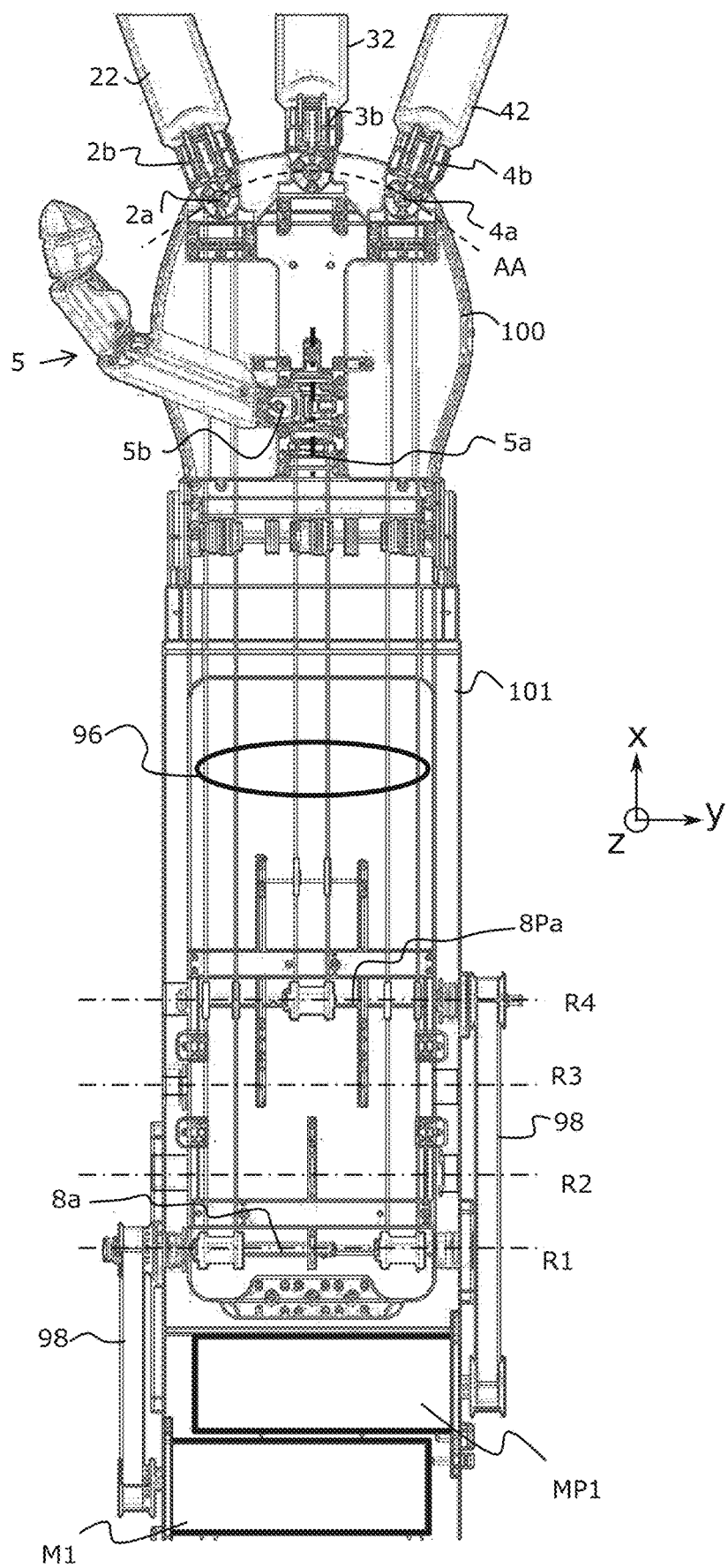
FIG. 9 is a top view of the device forming a robotic hand according to FIGS. 5 and 6, the support being viewed as transparent, so as to show only the second stage of actuators and intermediate drive shafts.

Each intermediate drive shaft 8a, 8b, 8c is connected to a single row of articulations; the other intermediate drive shafts 8Pa, 8Pb, 8Pc are each connected to a single articulation. With reference to FIG. 9, the intermediate drive shaft 8a is connected to the row of abduction/adduction articulations AA comprising the articulations 2a and 4a of the phalanges 22 and 42. The intermediate drive shaft 8a bears two drive pulleys each having two anchorage points for two flexible drive links, said two flexible links being connected to driven pulleys 325, 326 described above. In order to obtain a synchronized decrease or increase in the distance between the index finger and the ring finger, the flexible drive links connected to the shaft 8a must be disposed symmetrically with respect to a longitudinal median geometric plane parallel to a plane xz. Also shown in FIG. 9, the intermediate drive shaft 8Pa is connected to the abduction/adduction articulation 5a of the thumb. The shaft 8Pa bears a drive pulley having two anchorage points for two flexible drive links that are connected to driven pulleys 325, 326 described above.

Figure 10:
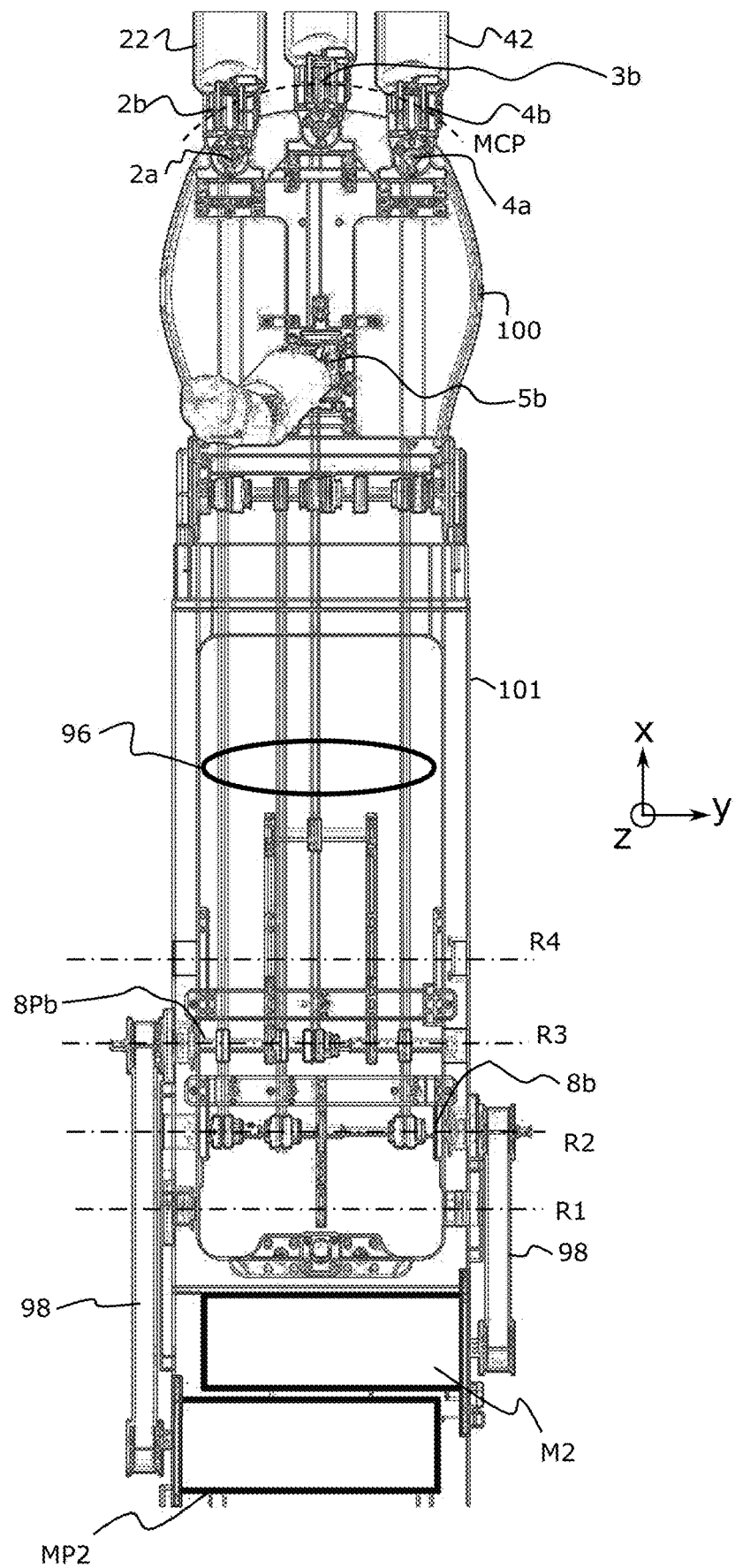
FIG. 10 is a top view of the device forming a robotic hand according to FIGS. 5 and 6, the support being viewed as transparent, so as to show only the first stage of actuators and intermediate drive shafts.

With reference to FIG. 10, the intermediate drive shaft 8b is connected to the row of metacarpophalangeal (MCP) articulations 2b, 3b and 4b of the phalanges 22, 32 and 42. The shaft 8b bears three drive pulleys each having two anchorage points for two flexible drive links, said two flexible links being connected to driven pulleys 525, 526 described above. Also shown in FIG. 10, the intermediate drive shaft 8Pb is connected to the flexion/extension articulation 5b of the thumb. The shaft 8Pb bears a drive pulley having two anchorage points for two flexible drive links that are connected to driven pulleys 525, 526 described above.

Figure 11:
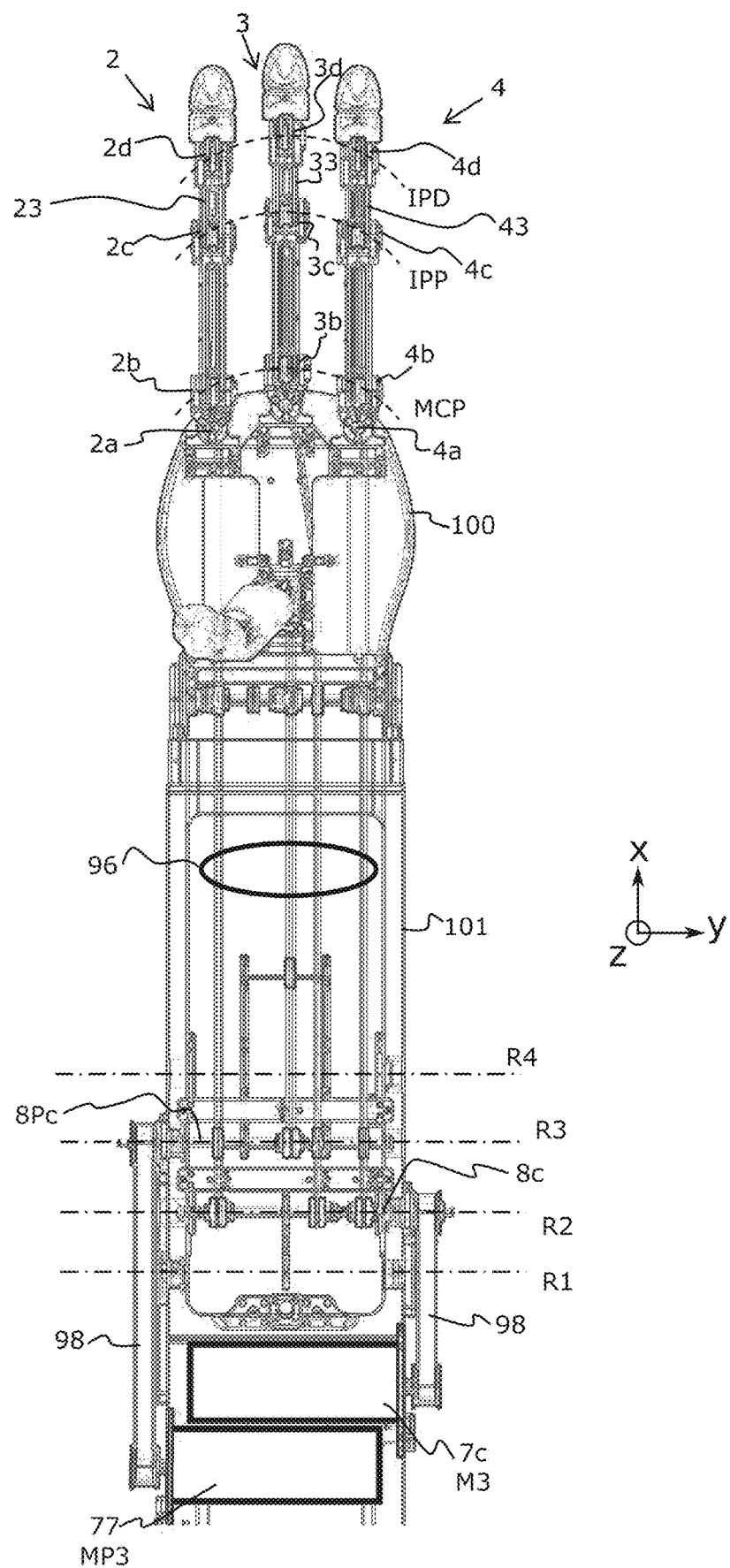
FIG. 11 is a top view of the device forming a robotic hand according to FIGS. 5 and 6, the support being viewed as transparent, so as to show only the third stage of actuators and intermediate drive shafts.

With reference to FIG. 11, the intermediate drive shaft 8c is connected to the row of proximal interphalangeal (PIP) articulations comprising the articulations 2c, 3c and 4c of the phalanges 23, 33 and 43. The shaft 8c bears three drive pulleys each having two anchorage points for two flexible drive links, said two flexible links being connected to driven pulleys 725, 726 described above. Also shown in FIG. 11, the intermediate drive shaft 8Pc is connected to the flexion/extension articulation 5c of the thumb. The shaft 8Pc bears a drive pulley having two anchorage points for two flexible drive links that are connected to driven pulleys 725, 726 described above.

Finally, actuation of the intermediate drive shaft 8c also makes it possible to actuate the row of distal interphalangeal (DIP) articulations comprising the articulations 2d, 3d, 4d via flexible connecting links or cables 142, 144 described above. Similarly, the intermediate drive shaft 8Pc makes it possible to actuate the articulation 5d via the flexible connecting links 142, 144 described above. This characteristic makes it possible to synchronize the angular movement of the articulations 2d, 3d, 4d, 5d with the angular movement of the articulations 2c, 3c, 4c, 5c.

The invention claimed is:

1. A device forming a robotic hand, characterized in that it comprises:
   a base forming a palm of the hand;
   at least two articulated structures each forming a robotic digit, each articulated structure being functionally connected to the base and comprising at least one articulation, so as to move said articulated structure with respect to the base;
   at least one drive mechanism for moving each articulation;
   at least one actuator arranged to actuate the at least one drive mechanism by means of at least one flexible drive link connecting and driving the at least one drive mechanism;
   at least one intermediate drive shaft for transmitting rotational movement of the at least one actuator, functionally disposed between each the at least one actuator and the associated at least one actuated drive mechanism, in such a way that:
   the at least one intermediate drive shaft is actuated by an actuator; and
   the at least one intermediate drive shaft is functionally connected to the at least two distinct drive mechanisms, each drive mechanism being functionally connected to said intermediate drive shaft by means of the at least one flexible drive link.

2. The device according to claim 1, characterized in that at least one intermediate drive shaft is functionally connected to at least two drive mechanisms, each mechanism being functionally disposed on a distinct articulated structure.

3. The device according to claim 1, characterized in that the at least two articulated structures each comprise at least two distinct structural elements and at least two distinct articulations, which are functionally connected together at at least two articulations to form a robotic digit, and in that the at least one intermediate drive shaft is functionally connected to at least two drive mechanisms associated with an articulation of the same type and/or function, each mechanism being disposed on a distinct articulated structure.

4. The device according to claim 1, characterized in that the at least two articulated structures each comprise at least two distinct structural elements and at least two distinct articulations, which are functionally connected together at at least two articulations to form a robotic digit, and in that the at least two articulations are coupled together by means of a flexible connecting link.

5. The device according to claim 1, characterized in that the at least one actuator is associated with a single intermediate drive shaft.

6. The device according to claim 1, characterized in that the at least one actuator comprises an axis of rotation that is parallel and not coaxial with the axis of the at least one intermediate drive shaft, in such a way that each intermediate drive shaft is actuated by an actuator by means of a flexible actuation link.

7. The device according to claim 1, characterized in that it comprises at least two actuators, a first actuator and a second actuator, arranged in parallel and side by side, the second actuator of which has a rotation shaft emerging from a side opposite to that of the first actuator.

8. The device according to claim 1, characterized in that the at least one articulation is of the type producing a pivot link about an axis of flexion with respect to the base, and in that the axis of the at least one intermediate drive shaft is substantially parallel to the axis of flexion.

9. The device according to claim 1, characterized in that the at least one intermediate drive shaft comprises at least one drive pulley and the at least one drive mechanism comprises at least one driven pulley, in such a way that the at least one flexible drive link is connected to said pulleys.

10. The device according to claim 1, characterized in that it comprises a support on which the at least one actuator and the at least one intermediate drive shaft are fixed, the support being functionally connected to the base.

11. A robot comprising at least one articulated arm, which comprises at least one device forming a robotic hand according to claim 1.

* * * * *